United States Patent
Dai et al.

(10) Patent No.: US 9,415,533 B2
(45) Date of Patent: Aug. 16, 2016

(54) COATING DEVICE AND COATING SYSTEM

(71) Applicant: HON HAI PRECISION INDUSTRY CO., LTD., New Taipei (TW)

(72) Inventors: Feng-Yuen Dai, New Taipei (TW);
Jih-Chen Liu, New Taipei (TW);
Hung-Lien Yeh, New Taipei (TW);
Han-Lung Lee, New Taipei (TW);
Shun-Chi Tseng, New Taipei (TW);
Hung-Chun Ma, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/678,364

(22) Filed: Apr. 3, 2015

(65) Prior Publication Data

US 2015/0306797 A1    Oct. 29, 2015

(51) Int. Cl.
*B29C 31/08* (2006.01)
*B29C 45/14* (2006.01)
*B29L 9/00* (2006.01)
*B29K 105/00* (2006.01)
*B29C 33/00* (2006.01)
*B29C 35/08* (2006.01)

(52) U.S. Cl.
CPC ..... *B29C 45/14336* (2013.01); *B29C 45/14065* (2013.01); *B29C 35/0888* (2013.01); *B29C 45/14008* (2013.01); *B29C 2033/0005* (2013.01); *B29C 2035/0827* (2013.01); *B29C 2045/14155* (2013.01); *B29K 2105/0097* (2013.01); *B29L 2009/005* (2013.01)

(58) Field of Classification Search
CPC .............. B29C 45/14336; B29C 45/14032; B29C 2045/14049; B29C 45/27; B29C 45/14008; B29C 45/14065; B29C 2045/14098; B29C 31/08; B29C 45/34
See application file for complete search history.

(56) References Cited

U.S. PATENT DOCUMENTS

| | | | | |
|---|---|---|---|---|
| 3,247,550 A * | 4/1966 | Haines, Jr. | ............... | B29C 33/18 249/66.1 |
| 4,604,026 A * | 8/1986 | Barrett | ................. | B25J 15/0616 414/718 |
| 4,797,236 A * | 1/1989 | Kojima | .................... | B29C 45/34 264/102 |
| 5,443,778 A * | 8/1995 | Schlingman | ............ | B29C 45/34 264/257 |
| 5,494,615 A * | 2/1996 | Wang Lee | ............... | B29D 12/02 264/1.7 |
| 5,639,403 A * | 6/1997 | Ida | .................... | B29C 45/14065 264/255 |
| 7,798,798 B2 * | 9/2010 | Boyd | ..................... | B29C 45/06 425/126.1 |
| 8,235,700 B2 * | 8/2012 | Lin | ..................... | B29C 45/2628 425/190 |
| 2009/0026677 A1 * | 1/2009 | Liu | .................. | B29C 45/14065 269/21 |
| 2012/0244321 A1 * | 9/2012 | Hsu | ........................... | B32B 3/30 428/172 |

* cited by examiner

*Primary Examiner* — Robert B Davis
(74) *Attorney, Agent, or Firm* — ScienBiziP, P.C.

(57) ABSTRACT

A coating system includes a coating device, a suction device, and a conveyor system. The coating device includes a first holding device including a first surface, a second holding device including a recess and opposite to the first holding device, an o-ring positioned on the first surface. The first holding device couples to the second holding device and a component is held on the first surface. A forming cavity is surrounded by the component, the recess, and the o-ring. Glue is injected into the forming cavity and is formed films over the component.

15 Claims, 17 Drawing Sheets

COATING DEVICE AND COATING SYSTEM

FIELD

The subject matter herein generally relates to a coating system for forming films of a component.

BACKGROUND

A protective film is generally sprayed on a component used in consumer electronics.

BRIEF DESCRIPTION OF THE DRAWINGS

Many aspects of the disclosure can be better understood with reference to the following drawing. The components in the drawing are not necessarily drawn to scale, the emphasis instead being placed upon clearly illustrating the principles of the disclosure. Implementations of the present technology will now be described, by way of example only, with reference to the attached figure.

DETAILED DESCRIPTION

Figure 1:
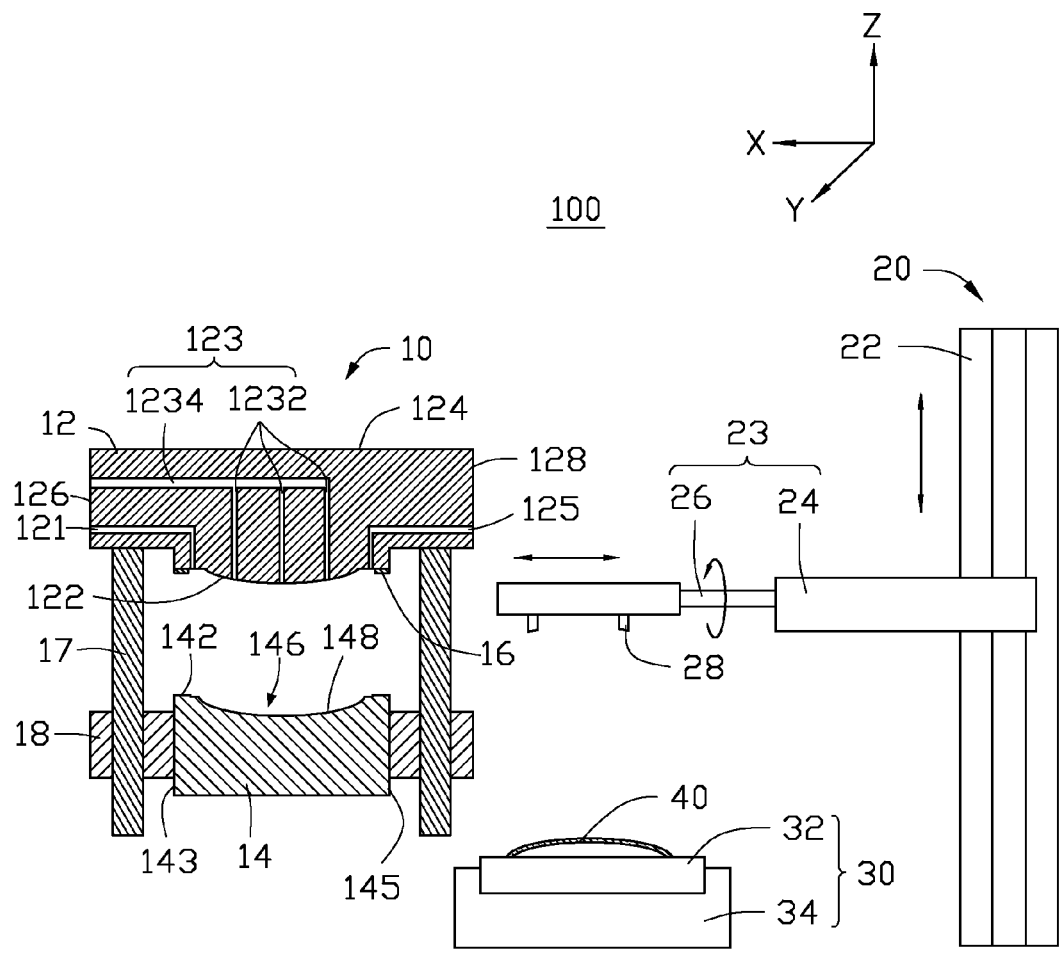
FIG. 1 is a diagrammatic, sectional view of a first embodiment of a coating system for forming films for a component.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure relates to a coating system for forming films of a component.

A first embodiment of a coating system 100 for forming films of a component 40 is shown in FIG. 1, the coating system 100 includes a coating device 10, a suction device 20, and a conveyor system 30.

The coating device 10 includes a first holding device 12, a second holding device 14, an o-ring 16, two locating columns 17, and two locating portions 18.

The first holding device 12 includes a first surface 122, a second surface 124 opposite to the first surface 122, a first side wall 126, a second side wall 128 opposite to the first side wall 126, a first suction channel 121, a second suction channel 123, and an injecting channel 125. The first side wall 126 and the second side wall 128 are both interconnected between the first surface 122 and the second surface 124.

In the embodiment, the first suction channel 121 and the second suction channel 123 pass through the first holding device 12 from the first surface 122 to the first side wall 126, the injecting channel 125 passes through the first holding device 12 from the first surface 122 to the second side wall 128. The second suction channel 123 includes three first suction holes 1232 and a second suction hole 1234, the second suction hole 1234 is defined in the first side wall 126 and through into the first holding device 12, the first suction holes 1232 are defined in the first surface 122 and through into the first holding device 12. The first suction holes 1232 connect to the second suction hole 1234, the second suction hole 1234 is used to draw air from the first suction holes 1232; the component 40 is suctioned by the second suction channel 123 and is held on the first surface 122.

The second holding device 14 is formed by a transparent material and corresponds to the first holding device 12. The second holding device 14 includes a forming surface 142 opposite to the first surface 122, a first outer surface 143, and a second outer surface 145. The first outer surface 143 and the second outer surface 145 are vertically connected to the forming surface 142. A recess 146 is defined in the forming surface 142, and the recess 146 includes a bottom surface 148.

The o-ring 16 is positioned on the first surface 122.

The locating columns 17 are positioned on the first surface 122 near an edge of the first surface 122.

The locating portions 18 are positioned beside the second holding device 14 and align with the first outer surface 143 and the second outer surface 145. The locating columns 17 are inserted correspondingly into the locating portions 18, and the second holding device 14 moves along the locating columns 17.

The suction device 20 includes a pole 22, a cantilever 23, and a suction portion 28. The cantilever 23 includes a first portion 24 and a second portion 26. The first portion 24 is used to couple to the pole 22 and moves along the pole 22. The second portion 26 is interlocked with the first portion 24, and the second portion 26 is rotatable and slides telescopically into the first portion 24. The suction portion 28 couples to the second portion 26 and is used to suction the component 40. In the embodiment, a z axis is defined to be parallel to the pole 22 and an x axis is defined to be parallel to the cantilever 23. The cantilever 23 moves up and down along the z axis. The second portion 26 can rotate with the central axis of the x axis and slides telescopically into the first portion 24 along the x axis with the suction portion 28.

The conveyor system 30 is positioned under the cantilever 23 and includes a conveyor belt 32 and a base 34. The conveyor belt 32 is positioned on the base 34 and is used to transport the component 40 to a first location, and convey the component 40 to a next process after the films were formed for the component 40. The first location corresponds to the position under the suction portion 28.

The first embodiment for forming films of the component 40 by the coating system 100 is presented in accordance with FIG. 1 to FIG. 16. The embodiment is provided by way of example, as there are a variety of ways to carry out the method. Each of the figures represents one or more processes, methods or subroutines, carried out in the example method. Additionally, the illustrated order of figures is by example only and the order of the figures can change according to the present disclosure. The example method can begin at FIG. 1.

In FIG. 1, the conveyor belt 32 transports the component 40 to the first location.

Figure 2:
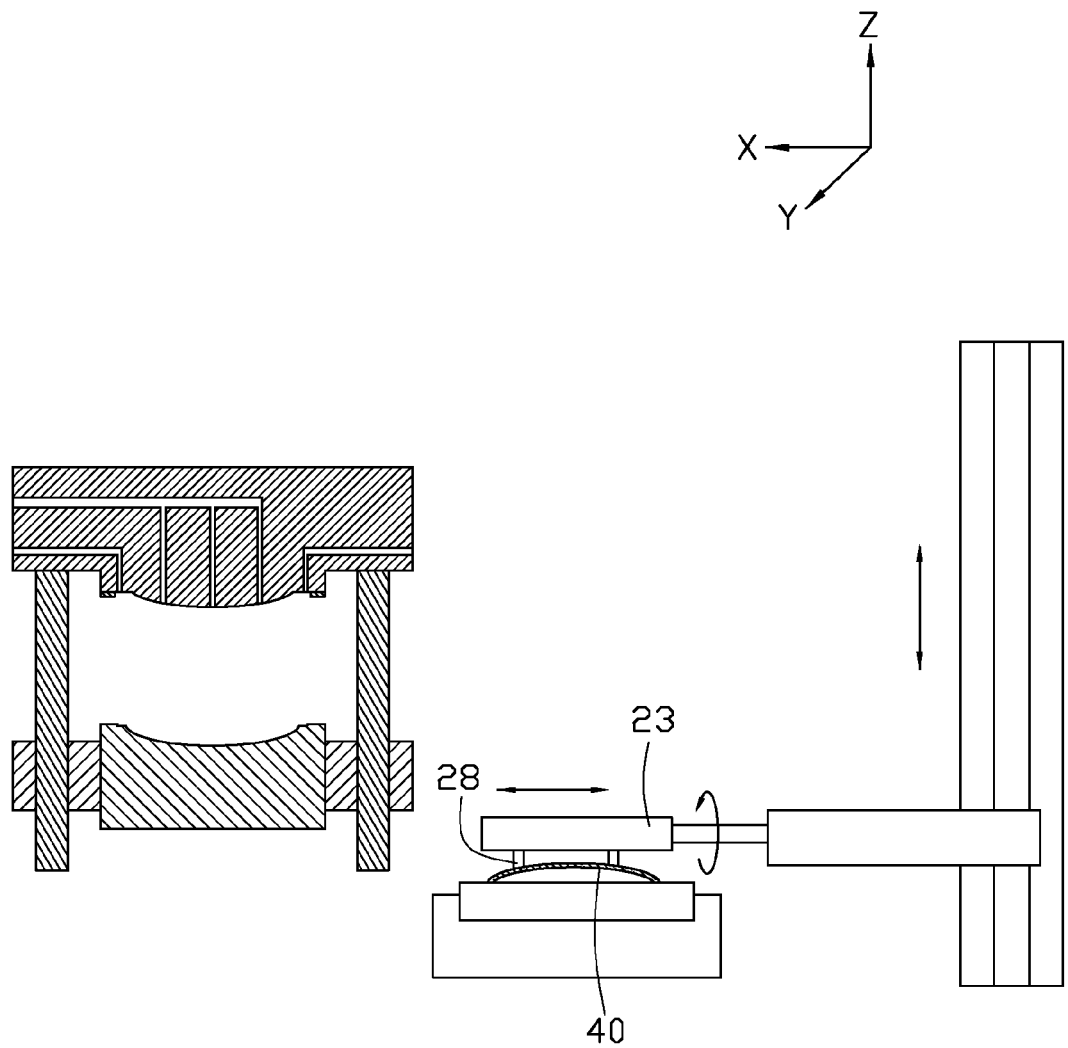
FIG. 2 is a diagrammatic, sectional view of the first embodiment of the coating system for forming films for a component suctioning by a suction device of FIG. 1.

In FIG. 2, the cantilever 23 moves down along the z axis until the suction portion 28 approaches the component 40; the component 40 is suctioned by the suction portion 28.

Figure 3:
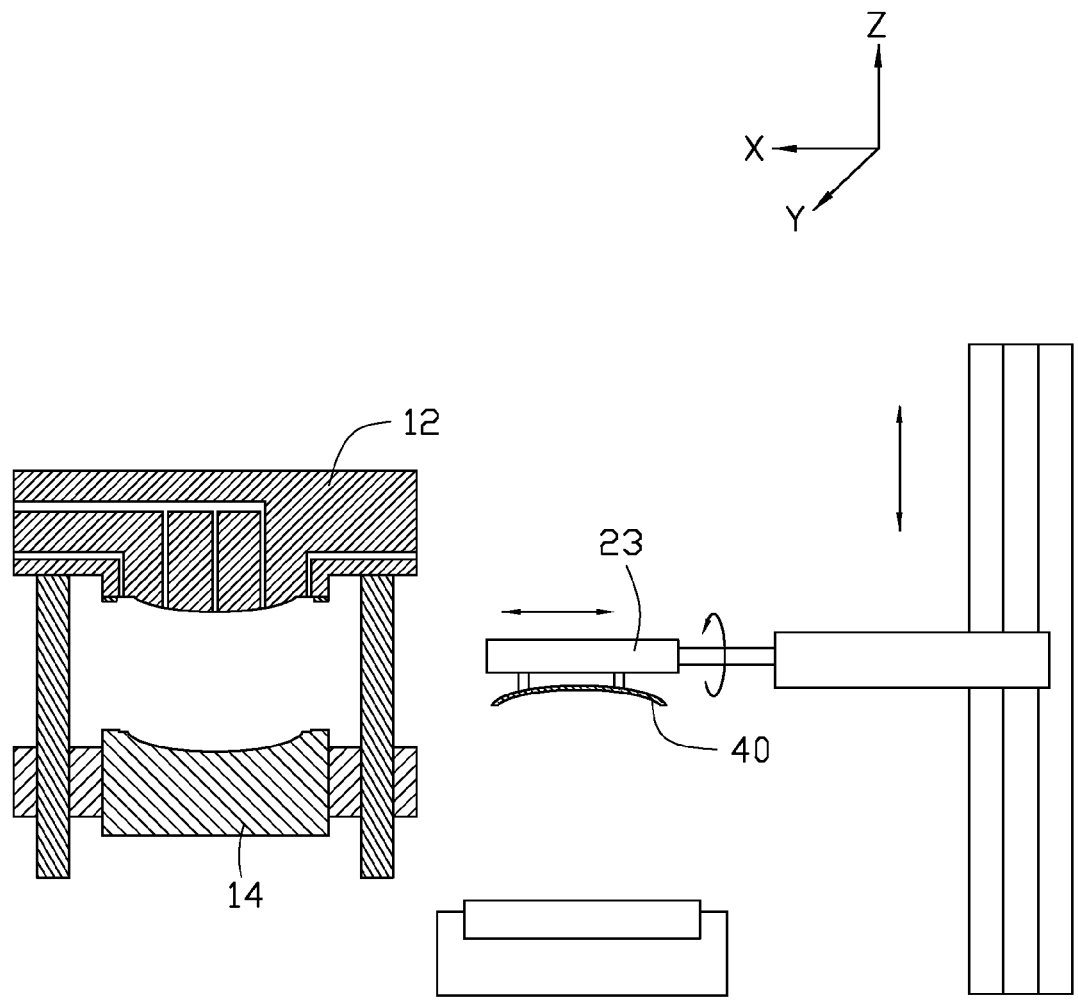
FIG. 3 is a diagrammatic, sectional view of the first embodiment of the coating system for forming films for a component receiving correspondingly in a space of a coating device of FIG. 1.

In FIG. 3, the cantilever 23 moves up along the z axis with the component 40 until reaching a first height, the cantilever 23 and the component 40 are correspondingly received in a space defined between the first holding device 12 and the second holding device 14.

Figure 4:
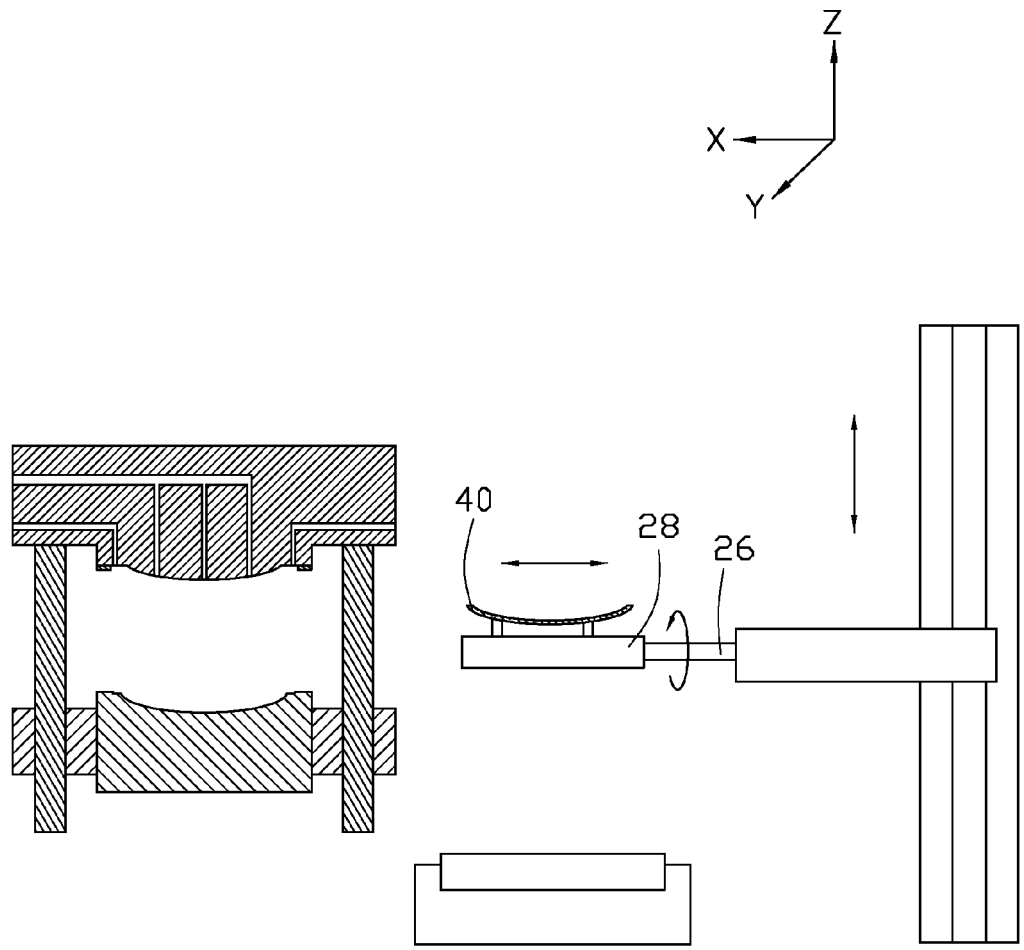
FIG. 4 is a diagrammatic, sectional view of the first embodiment of the coating system for forming films for a component of FIG. 1 to rotate a second portion of a cantilever of the suction device.

In FIG. 4, the second portion 26 rotates on the x axis, so that the component 40 is facing up.

Figure 5:
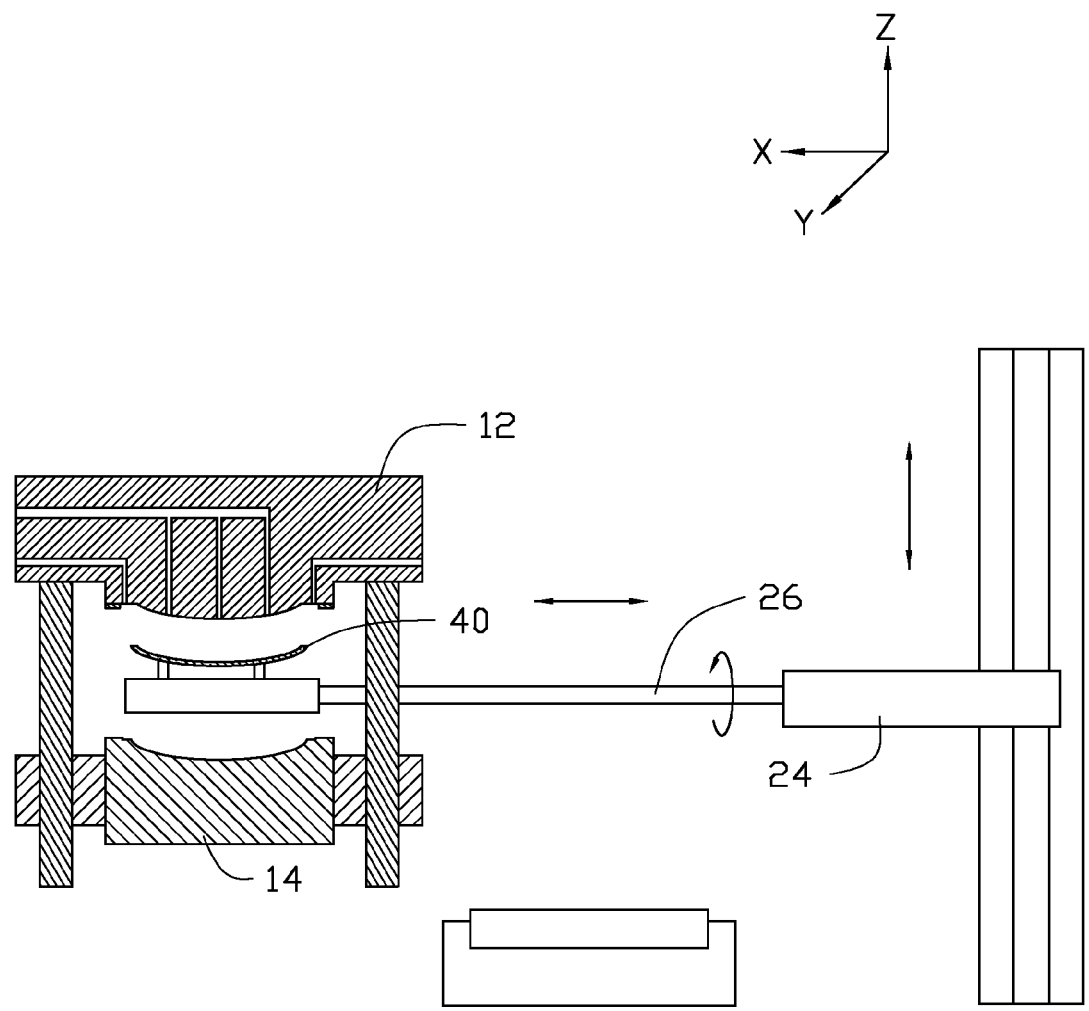
FIG. 5 is a diagrammatic, sectional view of the first embodiment of the coating system for forming films for a component of FIG. 1 to slide the second portion of the cantilever allowing the component to enter the space.

In FIG. 5, the second portion 26 slides out of the first portion 24 allowing the component 40 to enter the space between the first holding device 12 and the second holding device 14.

Figure 6:
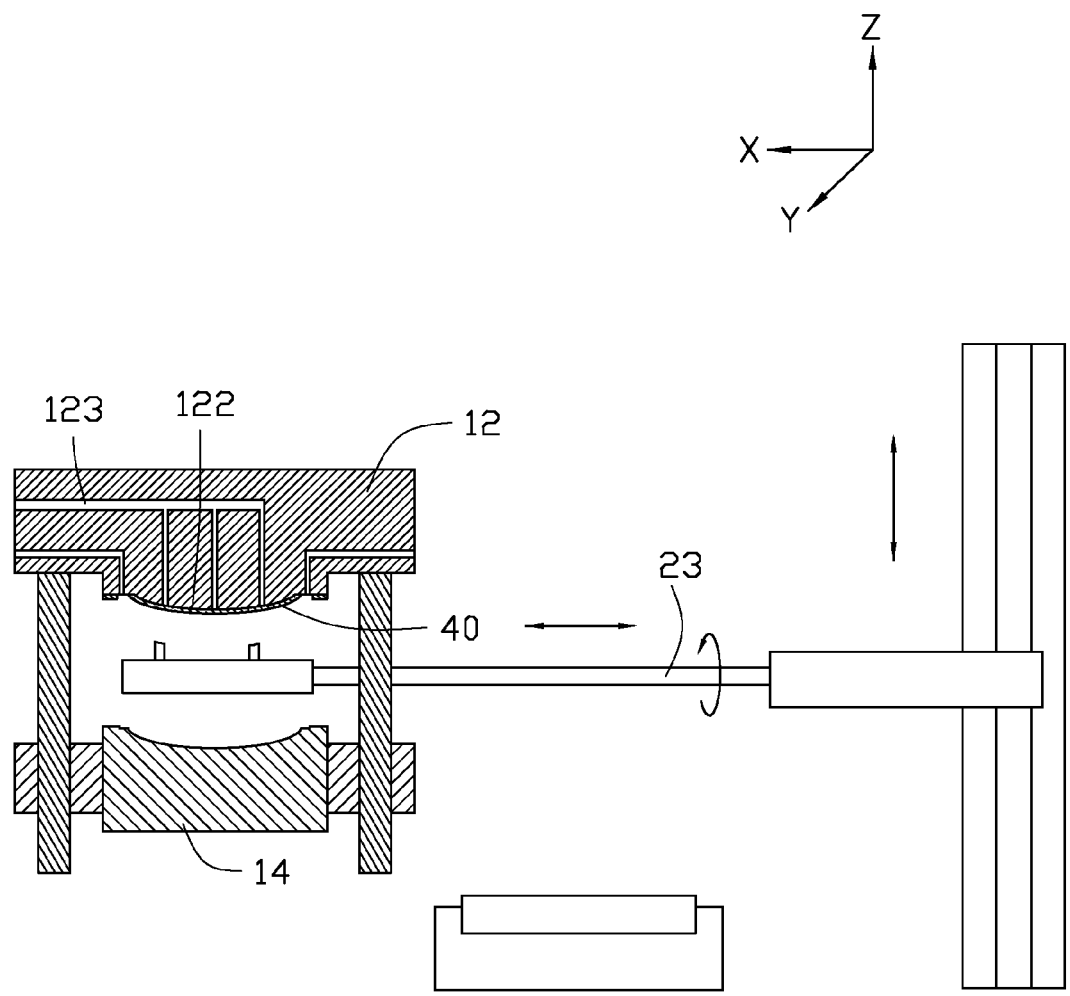
FIG. 6 is a diagrammatic, sectional view of the first embodiment of the coating system for forming films for a component suctioning by a first holding device of the coating device of FIG. 1.

In FIG. 6, the cantilever 23 moves along the z axis and the component 40 approaches the first surface 122 of the first holding device 12. The component 40 is suctioned by the second suction channel 123.

Figure 7:
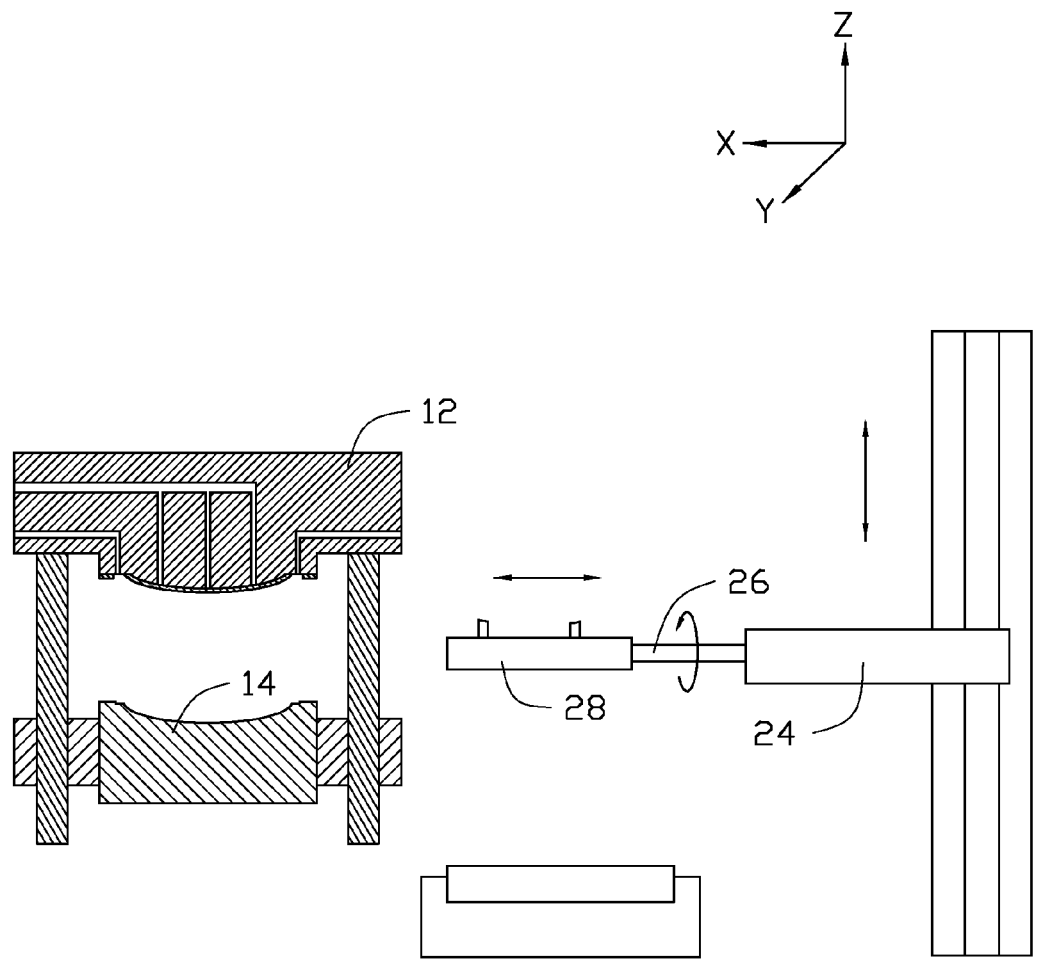
FIG. 7 is a diagrammatic, sectional view of the first embodiment of the coating system for forming films for a component of FIG. 1 to move the second portion of the cantilever out of the space in the coating device.

In FIG. 7, the suction portion 28 moves away from the first holding device 12, the second portion 26 slides into the first portion 24.

Figure 8:
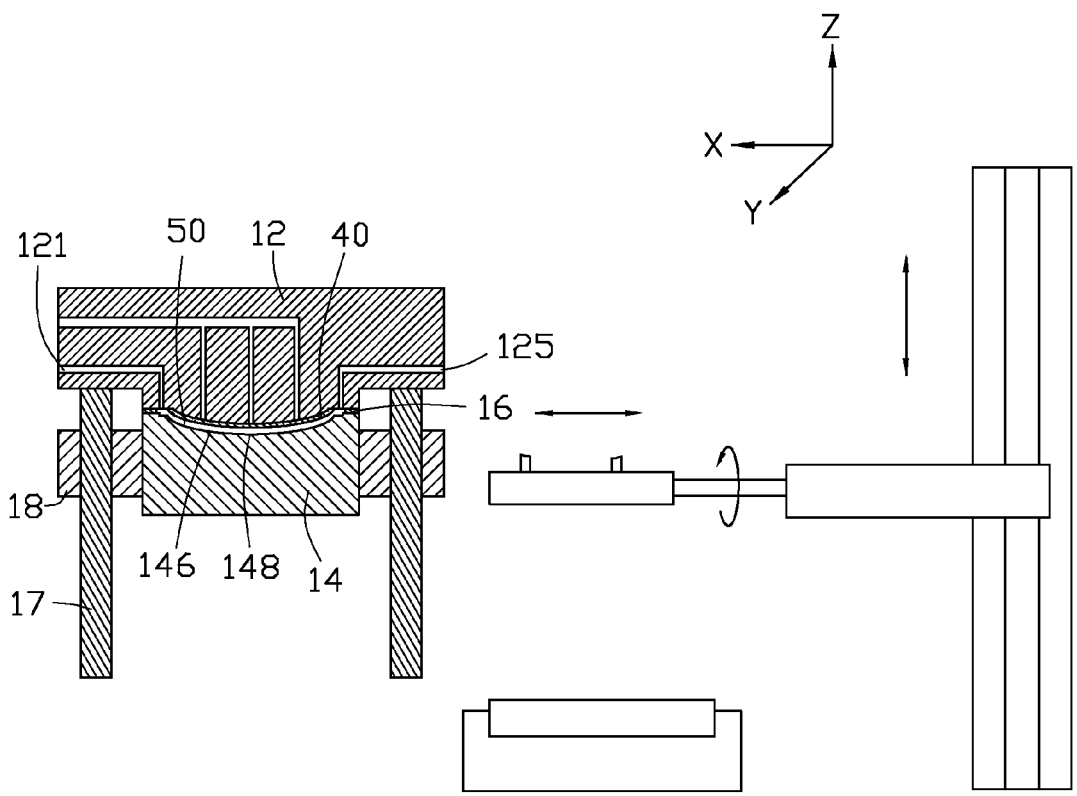
FIG. 8 is a diagrammatic, sectional view of the first embodiment of the coating system for forming films for a component of FIG. 1 to couple a second holding device of the coating device with the first holding device.

In FIG. 8, the second holding device 14 moves along the locating column 17 and couples to the first holding device 12 with the o-ring 16. A forming cavity 50 is defined and is surrounded by the component 40, the bottom surface 148 of the recess 146, and the o-ring 16, the forming cavity 50 connects with the first suction channel 121 and the injecting channel 125.

Figure 9:
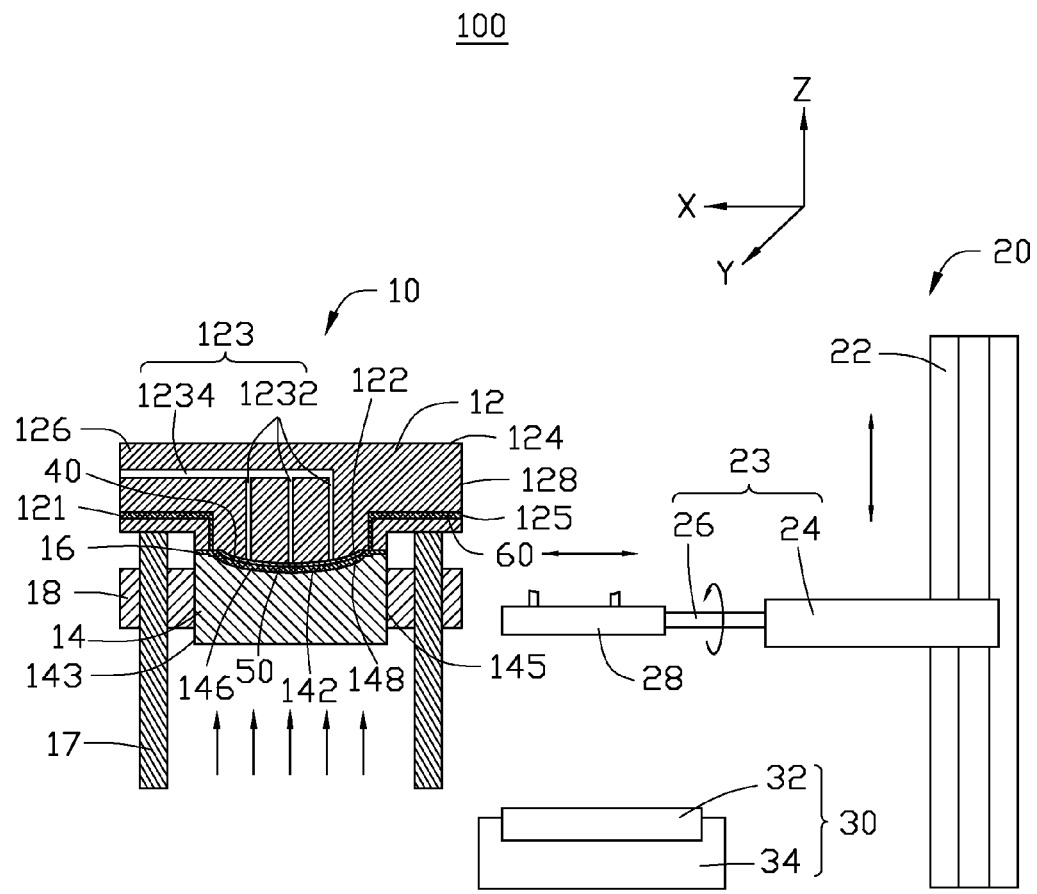
FIG. 9 is a diagrammatic, sectional view of the first embodiment of the coating system for forming films for a component of FIG. 1 to form films over the component.

In FIG. 9, the first suction channel 121 draws air from the forming cavity 50 and glue 60 is injected into the forming cavity 50 through the injecting channel 125. The glue 60 is uniformly filled in the forming cavity 50 and forms films over the component 40. In the embodiment, the glue 60 is cured by an ultra violet (UV) light passing through the second holding device 14 to form the film.

Figure 10:
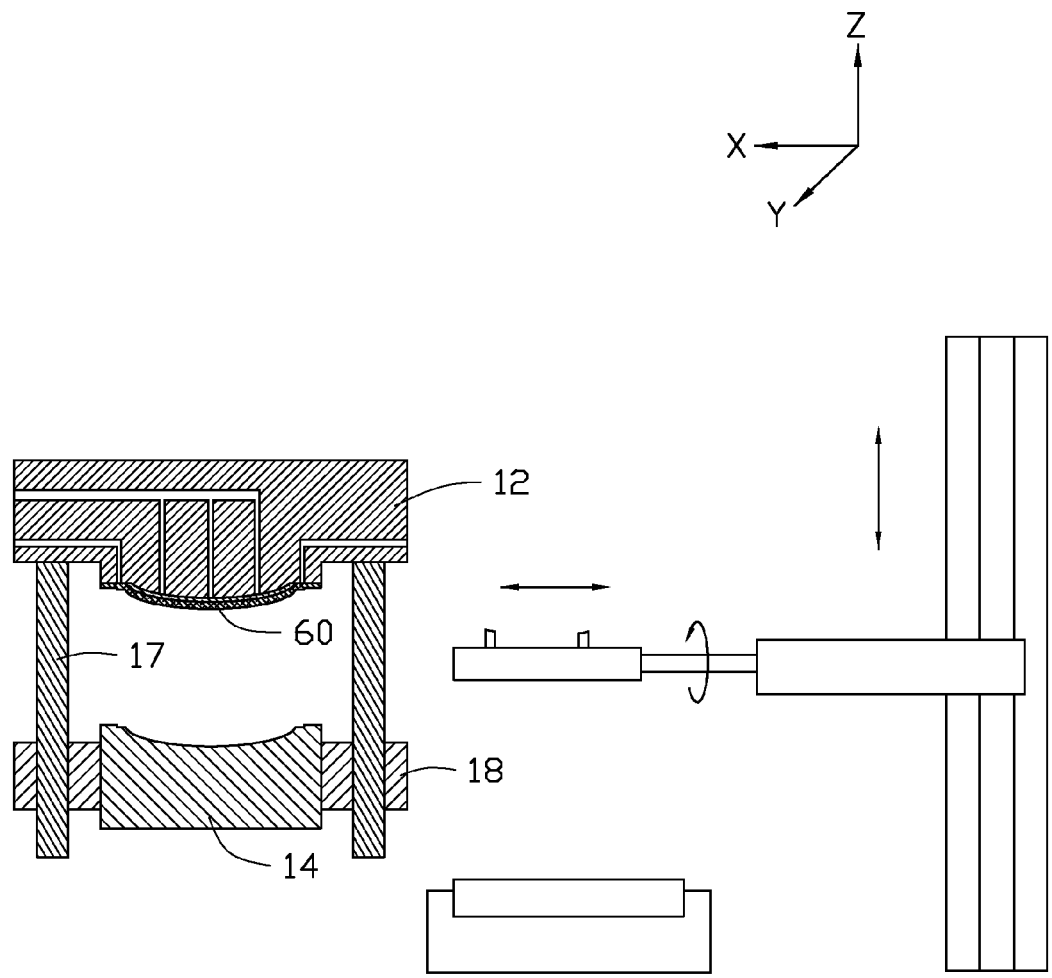
FIG. 10 is a diagrammatic, sectional view of the first embodiment of the coating system for forming films for a component of FIG. 1 to move the second holding device away from the first holding device.

In FIG. 10, the second holding device 14 moves away from the first holding device 12 along the locating column 17.

Figure 11:
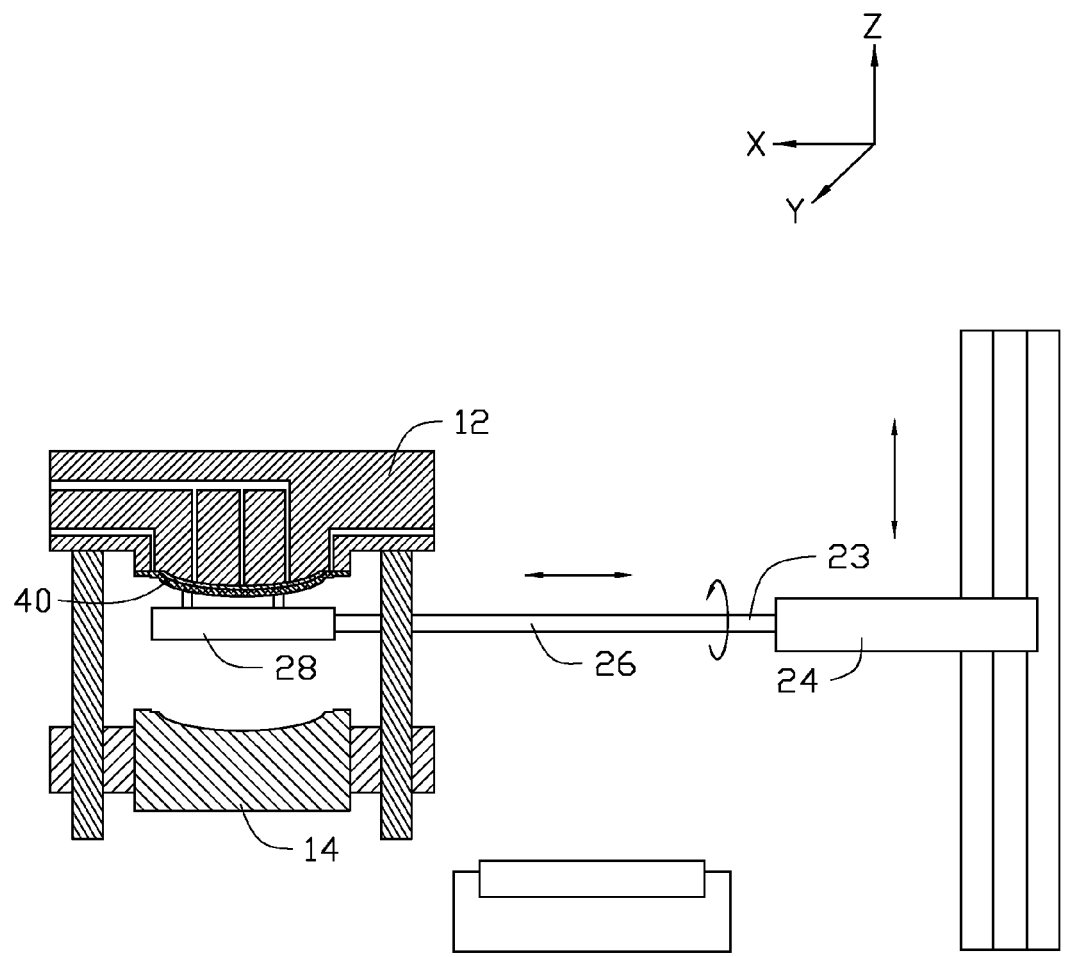
FIG. 11 is a diagrammatic, sectional view of the first embodiment of the coating system for forming films for a component of FIG. 1 to move the second portion to approach the component.

In FIG. 11, the component 40 is deposited with a formed film. The second portion 26 slides out of the first portion 24 allowing the suction portion 28 to enter the space between the first holding device 12 and the second holding device 14. The cantilever 23 moves along the z axis and the suction portion 28 approaches the component 40.

Figure 12:
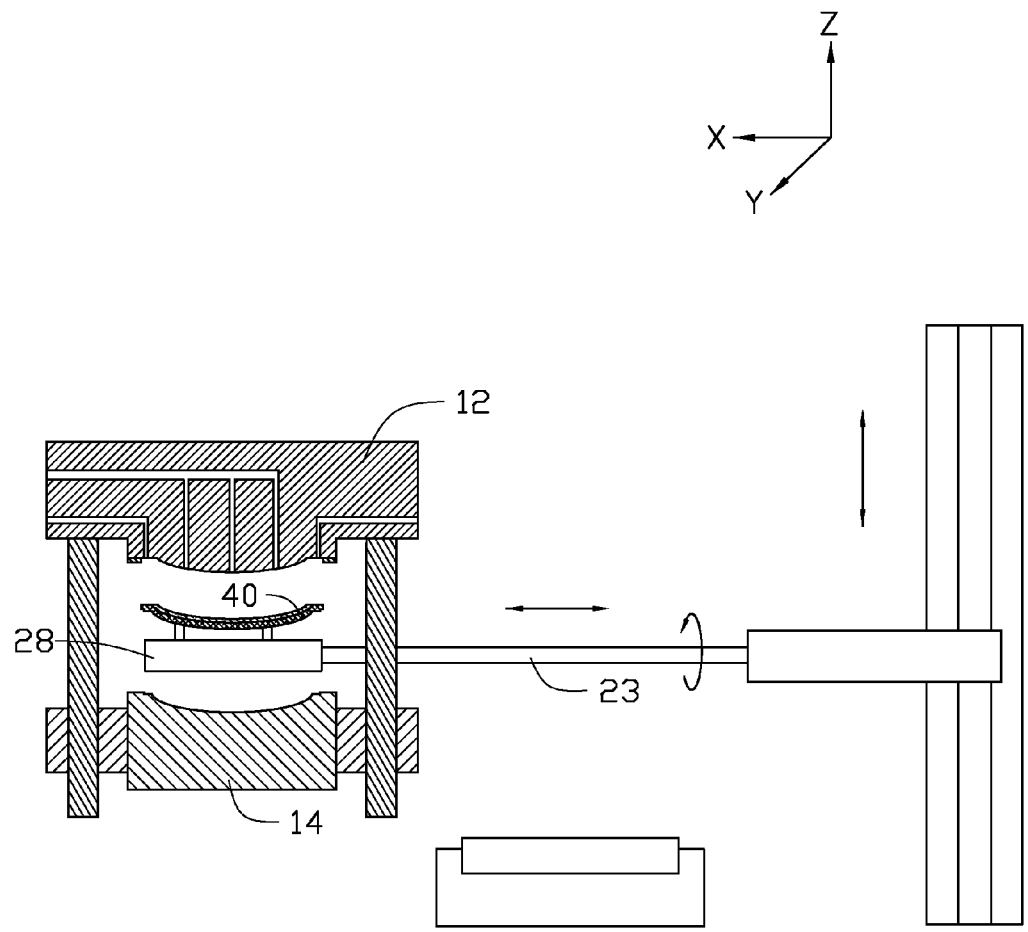
FIG. 12 is a diagrammatic, sectional view of the first embodiment of the coating system for forming films for a component of FIG. 1 to suction the component by the suction device and move the component away from the first holding device.

In FIG. 12, the component 40 is suctioned by the suction portion 28 and moves away from the first holding device 12.

Figure 13:
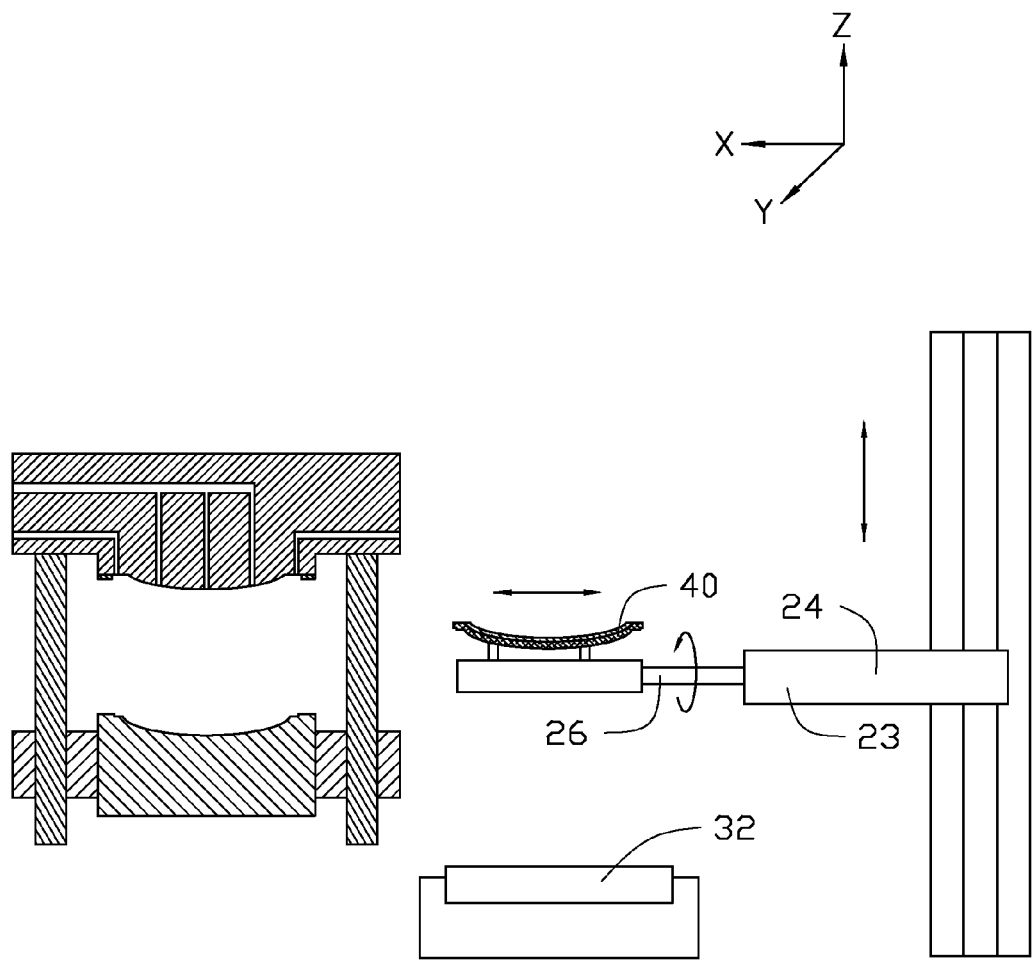
FIG. 13 is a diagrammatic, sectional view of the first embodiment of the coating system for forming films for a component moving out of the coating device of FIG. 1.

In FIG. 13, the second portion 26 slides into the first portion 24 until the component 40 reaches the first location.

Figure 14:
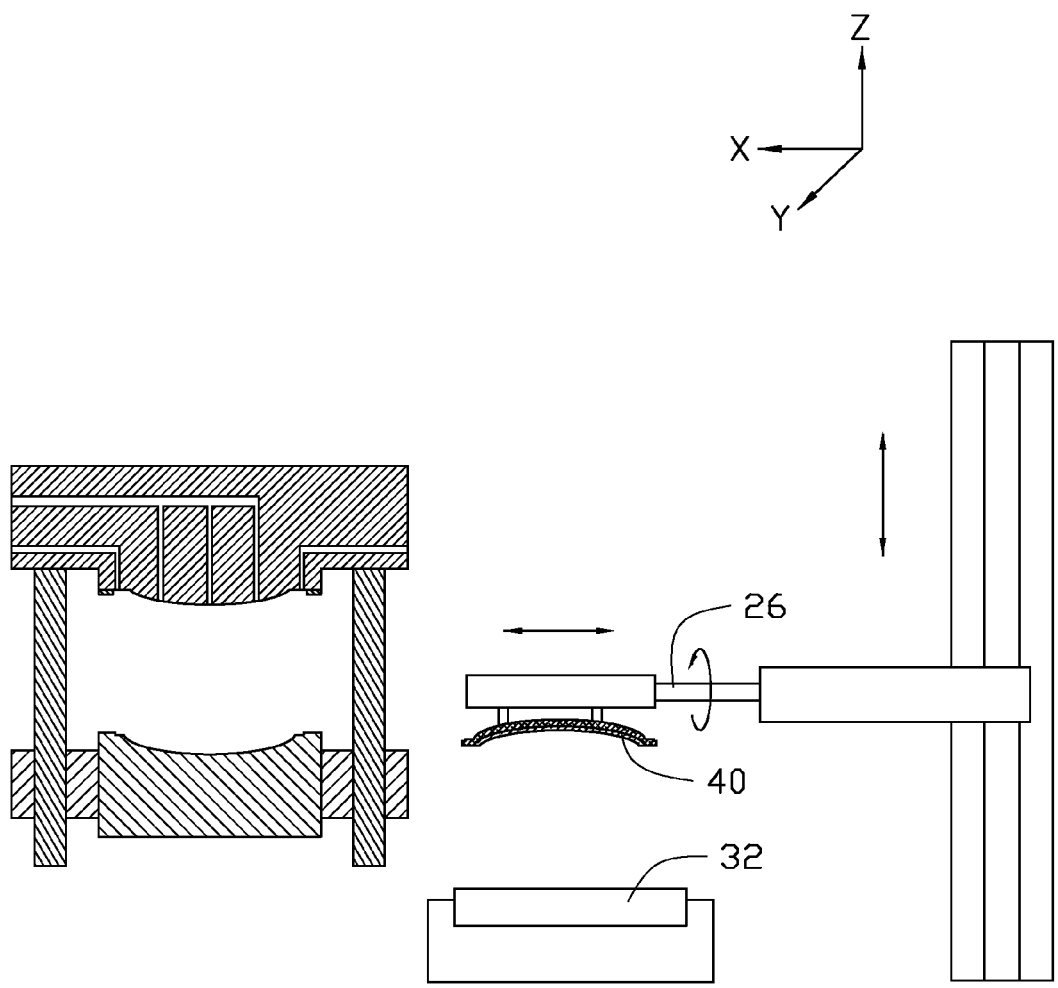
FIG. 14 is a diagrammatic, sectional view of the first embodiment of the coating system for forming films for a component of FIG. 1 to rotate the second portion.

In FIG. 14, the second portion 26 rotates on the x axis, and then the component 40 is facing down.

Figure 15:
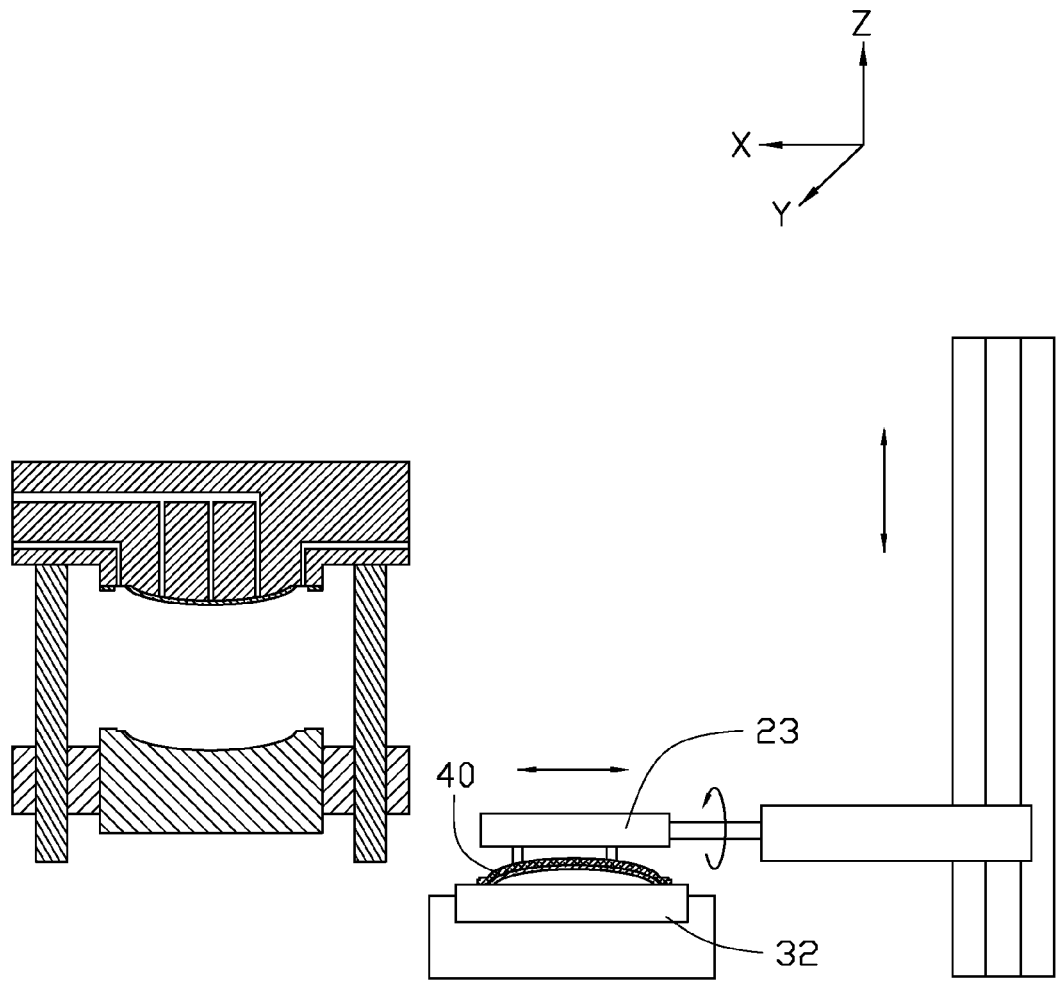
FIG. 15 is a diagrammatic, sectional view of the first embodiment of the coating system for forming films for a component suctioning to the conveyor belt of FIG. 1.

In FIG. 15, the cantilever 23 moves along the z axis and suctions the component 40 to the conveyor belt 32.

Figure 16:
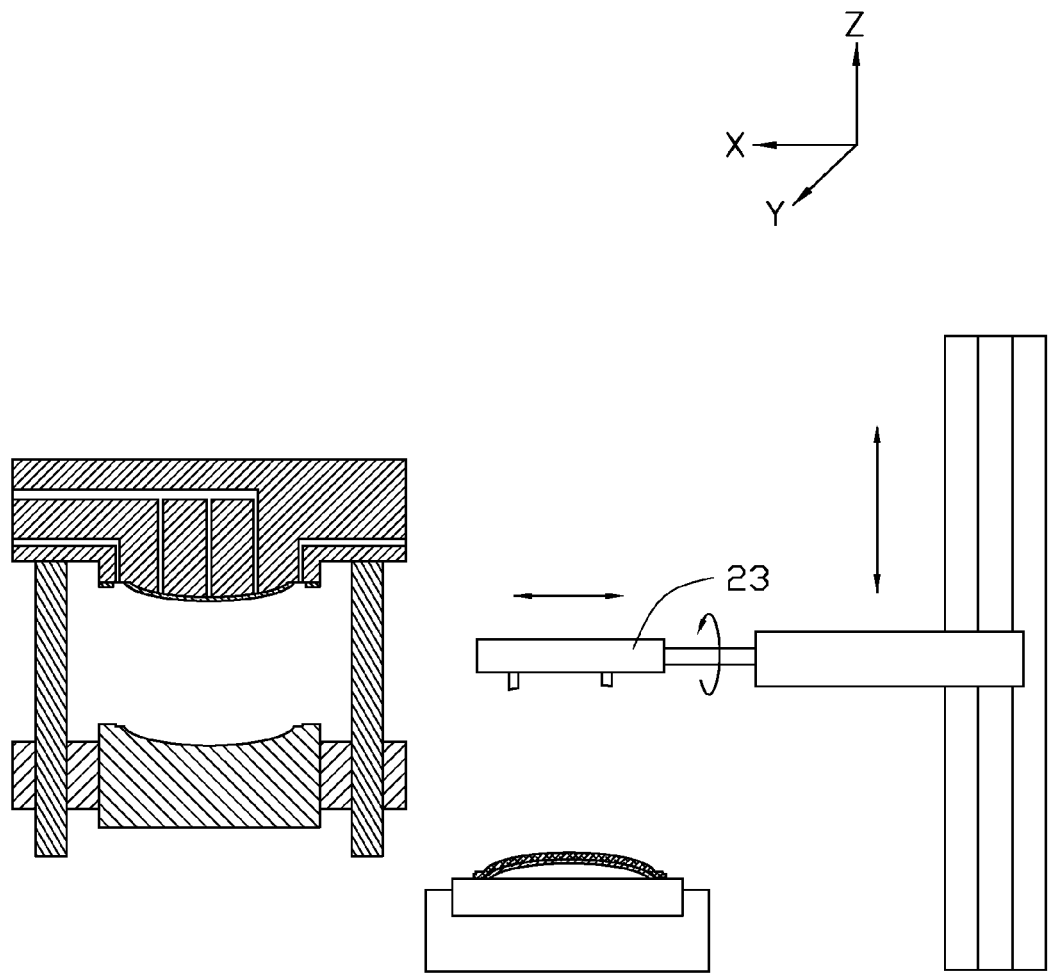
FIG. 16 is a diagrammatic, sectional view of the first embodiment of the coating system for forming films for a component of FIG. 1 to move the cantilever away from the component.

In FIG. 16, the cantilever 23 moves away from the component 40 and the conveyor belt 32 along the z axis.

Figure 17:
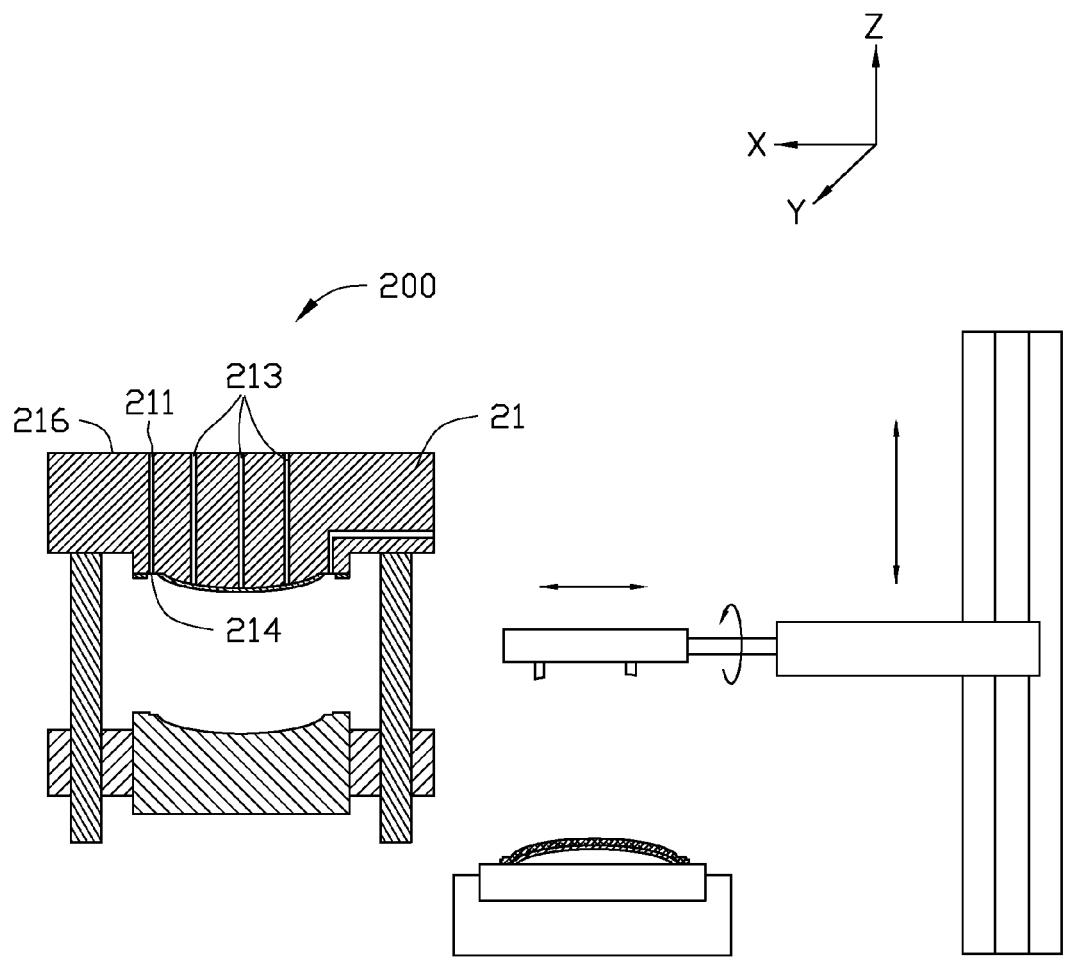
FIG. 17 is a diagrammatic, sectional view of a second embodiment of a coating system for forming films for a component of FIG. 1.

A second embodiment of a coating system 200 for forming films for a component 40 is shown in FIG. 17. The coating system 200 differs from the coating system 100 of the first embodiment in that the first suction channel 211 and the second suction channel 213 pass through the first holding device 21 from the first surface 214 to the second surface 216.

The embodiments shown and described above are only examples. Many details are often found in the art such as the other features of a coating system for forming films for a component. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A coating device for forming films for a component, comprising:
a first holding device, comprising:
a first surface;
a second surface opposite to the first surface;
a first side wall;
a second side wall opposite to the first side wall;
a first suction channel;
a second suction channel, the component held on the first surface of the first holding device by the second suction channel;
an injecting channel configured to inject a glue;
a second holding device coupled to the first holding device, the second holding device comprising:
a forming surface opposite the first surface of the first holding device; and
a recess defined in the forming surface; and
an o-ring positioned on the first surface of the first holding device, wherein the component, the recess, and the o-ring cooperatively form a forming cavity, the forming cavity connected with the first suction channel and the injecting channel, the first suction channel configured to draw air from the forming cavity.

2. The coating device in accordance with claim 1, wherein the first side wall and the second side wall are both interconnected between the first surface and the second surface, the first suction channel and the second suction channel pass through the first holding device from the first surface to the first side wall, the injecting channel passes through the first holding device from the first surface to the second side wall, an opening of the first suction channel adjacent to the first surface and an opening of the injecting channel adjacent to the first surface are located in a same plane.

3. The coating device in accordance with claim 2, wherein the second suction channel includes a plurality of first suction holes and a second suction hole, the second suction hole is defined in the first side wall and through into the first holding device, the first suction holes are defined in the first surface and through into the first holding device and connect to the second suction hole.

4. The coating device in accordance with claim 1, wherein the first side wall and the second side wall are both interconnected between the first surface and the second surface, the first suction channel and the second suction channel pass through the first holding device from the first surface to the second surface, the injecting channel passes through the first holding device from the first surface to the second side wall.

5. The coating device in accordance with claim 1, wherein the coating device includes two locating columns and two locating portions, the locating columns are positioned on the first surface, the locating portions are positioned beside the second holding device and correspond to the locating columns, the locating columns insert into the locating portions, the second holding device moves along the locating columns.

6. The coating device in accordance with claim 1, wherein the second holding device is formed by a transparent material.

7. A coating system, comprising:
a coating device, comprising:
a first holding device, comprising:
a first surface;
a second surface opposite to the first surface;
a first side wall;
a second side wall opposite to the first side wall;
a first suction channel;
a second suction channel, the component held on the first surface of the first holding device by the second suction channel;
an injecting channel configured to inject a glue;
a second holding device coupled to the first holding device, the second holding device comprising:
a forming surface opposite the first surface of the first holding device; and
a recess defined in the forming surface; and
an o-ring positioned on the first surface of the first holding device, wherein the component, the recess, and the o-ring cooperatively form a forming cavity, the forming cavity connected with the first suction channel and the injecting channel, the first suction channel configured to draw air from the forming cavity;
a suction device configured to suctioning a component to the coating device; and
a conveyor system configured to transporting the component.

8. The coating system in accordance with claim 7, wherein the suction device includes a pole, a cantilever, and a suction portion, the cantilever includes a first portion and a second portion, the first portion is configured to couple to the pole and moves along the pole, the second portion is interlocked with the first portion that the second portion is rotatable and slides telescopically into the first portion, the suction portion couple to the second portion and is configured to suction the component.

9. The coating system in accordance with claim 7, wherein the conveyor system includes a base and a conveyor belt, the conveyor belt is positioned on the base and configured to transport the component to a first location corresponding to the suction device.

10. The coating device in accordance with claim 2, wherein the first side wall and the second side wall are both interconnected between the first surface and the second surface, the first suction channel and the second suction channel pass through the first holding device from the first surface to the second surface, the injecting channel passes through the first holding device from the first surface to the second side wall.

11. The coating device in accordance with claim 2, wherein the coating device includes two locating columns and two locating portions, the locating columns are positioned on the first surface, the locating portions are positioned beside the second holding device and correspond to the locating columns, the locating columns insert into the locating portions, the second holding device moves along the locating columns.

12. The coating device in accordance with claim 2, wherein the second holding device is formed by a transparent material.

13. The coating device in accordance with claim 7, wherein the first side wall and the second side wall are both interconnected between the first surface and the second surface, the first suction channel and the second suction channel pass through the first holding device from the first surface to the first side wall, the injecting channel passes through the first holding device from the first surface to the second side wall, an opening of the first suction channel adjacent to the first surface and an opening of the injecting channel adjacent to the first surface are located in a same plane.

14. The coating system in accordance with claim 13, wherein the suction device includes a pole, a cantilever, and a suction portion, the cantilever includes a first portion and a second portion, the first portion is configured to couple to the pole and moves along the pole, the second portion is interlocked with the first portion that the second portion is rotatable and slides telescopically into the first portion, the suction portion couple to the second portion and is configured to suction the component.

15. The coating system in accordance with claim 14, wherein the conveyor system includes a base and a conveyor belt, the conveyor belt is positioned on the base and configured to transport the component to a first location corresponding to the suction device.

* * * * *